US006197402B1

(12) United States Patent
Miller et al.

(10) Patent No.: US 6,197,402 B1

(45) Date of Patent: Mar. 6, 2001

(54) FORMABLE HEAVY DENSITY HONEYCOMB

(75) Inventors: P. Shane Miller, Casa Grande; Robert B. Morrison, Phoenix; Earl F. Ayle, Chandler, all of AZ (US)

(73) Assignee: Hexcel Corporation, Dublin, CA (US)

( * ) Notice: Subject to any disclaimer, the term of this patent is extended or adjusted under 35 U.S.C. 154(b) by 0 days.

(21) Appl. No.: 09/241,046

(22) Filed: Feb. 1, 1999

(51) Int. Cl.[7] ........................................ B32B 3/12

(52) U.S. Cl. ........................................ 428/118; 428/116

(58) Field of Search ........................................ 428/116, 118

(56) References Cited

U.S. PATENT DOCUMENTS 5,346,367 * 9/1994 Doolin et al. ........................ 416/230

* cited by examiner

*Primary Examiner*—Francis J. Lorin

(74) *Attorney, Agent, or Firm*—W. Mark Bielawski; David J. Oldenkamp

(57) ABSTRACT

Heavy density honeycomb structures which include alternating layers of primary corrugated sheets and bisector sheets which are bonded together. The primary corrugated sheets are offset so that the bisector sheets are bonded to the corrugated sheet nodes so that the upper and lower bonding locations on each bisector sheet are displaced from each other. This displacement provides flexibility regions in the bisector sheets which enhance the formability of the heavy density honeycomb. The displaced node configuration is useful for enhancing thermal formability of both metallic and non-metallic honeycomb structures. The offset configuration is used with both substantially flat bisector sheets and corrugated bisector sheets.

21 Claims, 5 Drawing Sheets

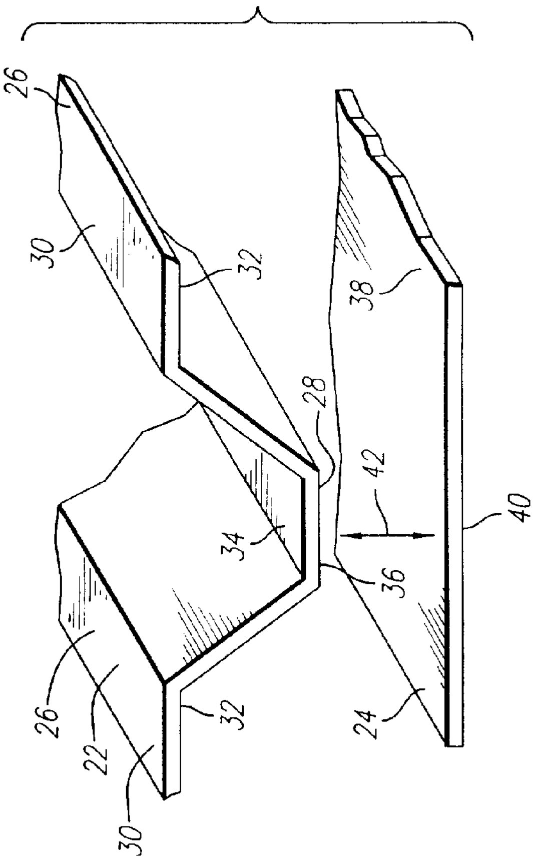
FIG. 3
FIG. 4
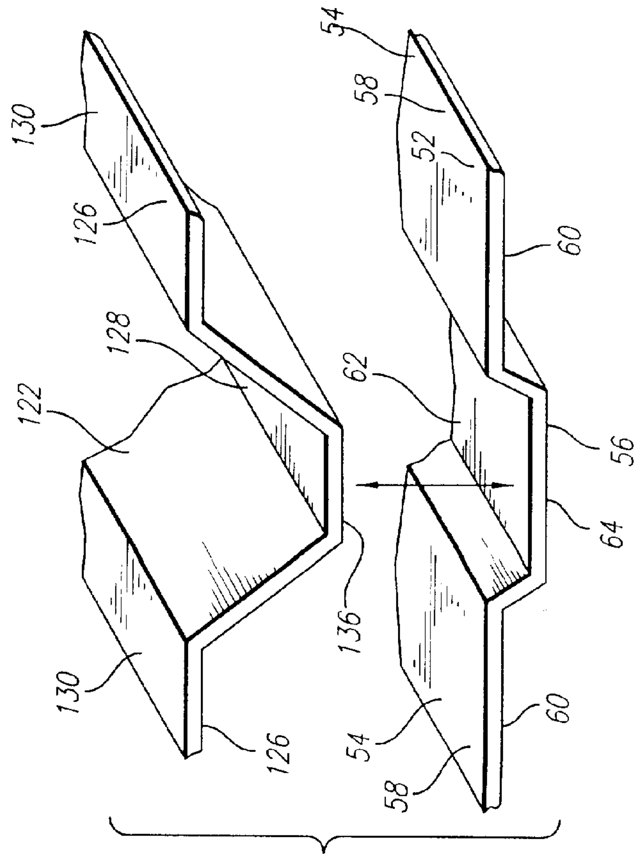

FORMABLE HEAVY DENSITY HONEYCOMB

BACKGROUND OF THE INVENTION

1. Field of the Invention

The present invention relates generally to heavy density non-metallic honeycomb structures. More particularly, the present invention involves increasing the formability of such honeycomb structures so they can be made into a wide variety of non-planar shapes.

2. Description of Related Art

Honeycomb structures which include bisector sheets are generally referred to as "high density honeycomb". These types of reinforced honeycombs are usually composed of a stack of alternating corrugated and bisector sheets which are glued or otherwise bonded together. A portion of a typical high density honeycomb is shown at 10 in FIG. 5. The honeycomb 10 includes bisector sheets 12 and corrugated sheets 14 which are bonded together at node junctures 16. As can be seen from FIG. 5, the bisector sheets 12 split the hexagonal honeycomb cells down the center. This configuration adds density, strength and bonding surface to the core. The high density honeycombs are well-suited for use in situations where high structural strength is required. However, the inherent stiffness of high density honeycomb and the presence of the bisector sheets makes it difficult to form such structures into non-planar shapes without damaging the honeycomb.

As shown in FIG. 5, honeycombs are three dimensional structures which are characterized as having a thickness (T direction) which is measured parallel to the honeycomb cell and provides a measure of the honeycomb depth. The width (W direction) of the honeycomb is measured perpendicular to the T direction and provides a measure of the height of the stacked honeycomb cells. The length (L direction) of the honeycomb is measured perpendicular to both the T and W directions and provides a measure of the length of the corrugated and bisector sheets present in the honeycomb (see FIG. 5).

When forming non-planar high density honeycomb structures, planar honeycombs of the type shown in FIG. 5 are formed in the L and/or W directions by applying heat and/or pressure to the honeycomb. When forming in the L direction, the outside radius of the core must expand in the L direction and inside radius of the core must contract in the L direction. The bisector sheet passing through the cell will not allow the cell to expand on the top of the radius. As a result, the inside of the cell must condense more. This causes the inside cell to deform or crush to such a degree that the resulting core may have reduced strength and/or the corrugated and bisector sheets may separate at the node junctures.

When forming non-planar high density honeycombs in the W direction, the outside radius of the cell must expand in the W direction and the inside radius of the core must contract in the W direction. The bisector sheets limit the movement of the cell walls so that the usual result is that the relatively stiff node junctures are torn apart.

Various approaches have been taken to try and increase the formability of high density honeycombs. For example, attempts have been made to increase node strength by using higher strength adhesives. Various thermosetting resins have been used in the resin matrix of composite honeycomb walls to enhance heat formability and various thermosetting dip resins have been used to coat honeycomb walls. The use of hybrid weaves for composite honeycomb walls has also been proposed. Although all of these approaches have achieved some improvement in formability of high density honeycomb, there still is a continuing need to increase and enhance the formability of such honeycomb structures.

SUMMARY OF THE INVENTION

In accordance with the present invention, it was discovered that the formability of high density honeycomb can be enhanced and increased by orienting the primary corrugated sheets and bisector sheets in a specific fashion which increases honeycomb flexibility without unduly affecting the overall strength of the high density honeycomb. This increase in flexibility is achieved by offsetting the honeycomb nodes so that the stiff node structures are separated and redistributed throughout the honeycomb to provide for increased formability. The offsetting of the honeycomb nodes allows for more deformation of the inside cells without failure when forming in the L direction. In the W direction, the offset node configuration allows the outside of the cell to expand and the inside to condense more without undue crushing or failure of the structure.

The honeycomb structures of the present invention include a plurality of primary corrugated sheets with each primary corrugated sheet having a plurality of alternating upper nodes and lower nodes. Each upper node includes a top surface and a bottom surface, and each lower node also includes a top surface and a bottom surface. A plurality of bisector sheets which each includes a top surface and a bottom surface are combined with the corrugated sheets to form the high density honeycomb structure which includes alternating layers of primary corrugated sheets and bisector sheets. The top surfaces of the upper nodes are bonded to the bottom surface of the bisector sheets at upper node bond locations on the bisector sheets. The bottom surfaces of the lower nodes are bonded to the top surfaces of the bisector sheets at lower node bond locations on the bisector sheets. As a feature of the present invention, the upper node bond locations and lower node bond locations on each bisector sheet are displaced from each other. This provides an offset node configuration which, as mentioned above, separates the node junctures and redistributes the density of the cells more evenly to allow for increased formability of the overall honeycomb structure.

The offset node design provided by the present invention is well suited for use in a wide variety of metallic and non-metallic, high density honeycomb structures where it is desired to form non-planar structures from the initially prepared planar honeycomb. The invention does not depend upon the use of specialized high strength adhesives or specialized thermal set resins or specialized weave patterns. Instead, the invention involves a basic reorientation of the honeycomb layers to provide increased and enhanced flexibility regardless of the specific materials being used for the primary corrugated sheets and bisector sheets.

The above described and many other features and attendant advantages of the present invention will become better understood by reference to the following detailed description when taken in conjunction with the accompanying drawings.

BRIEF DESCRIPTION OF THE DRAWINGS

FIG. 3 is a schematic representation showing how the honeycomb depicted in FIG. 1 is formed.

FIG. 4 is a schematic representation showing how the honeycomb depicted in FIG. 2 is formed.

DETAILED DESCRIPTION OF THE INVENTION

Figure 1:
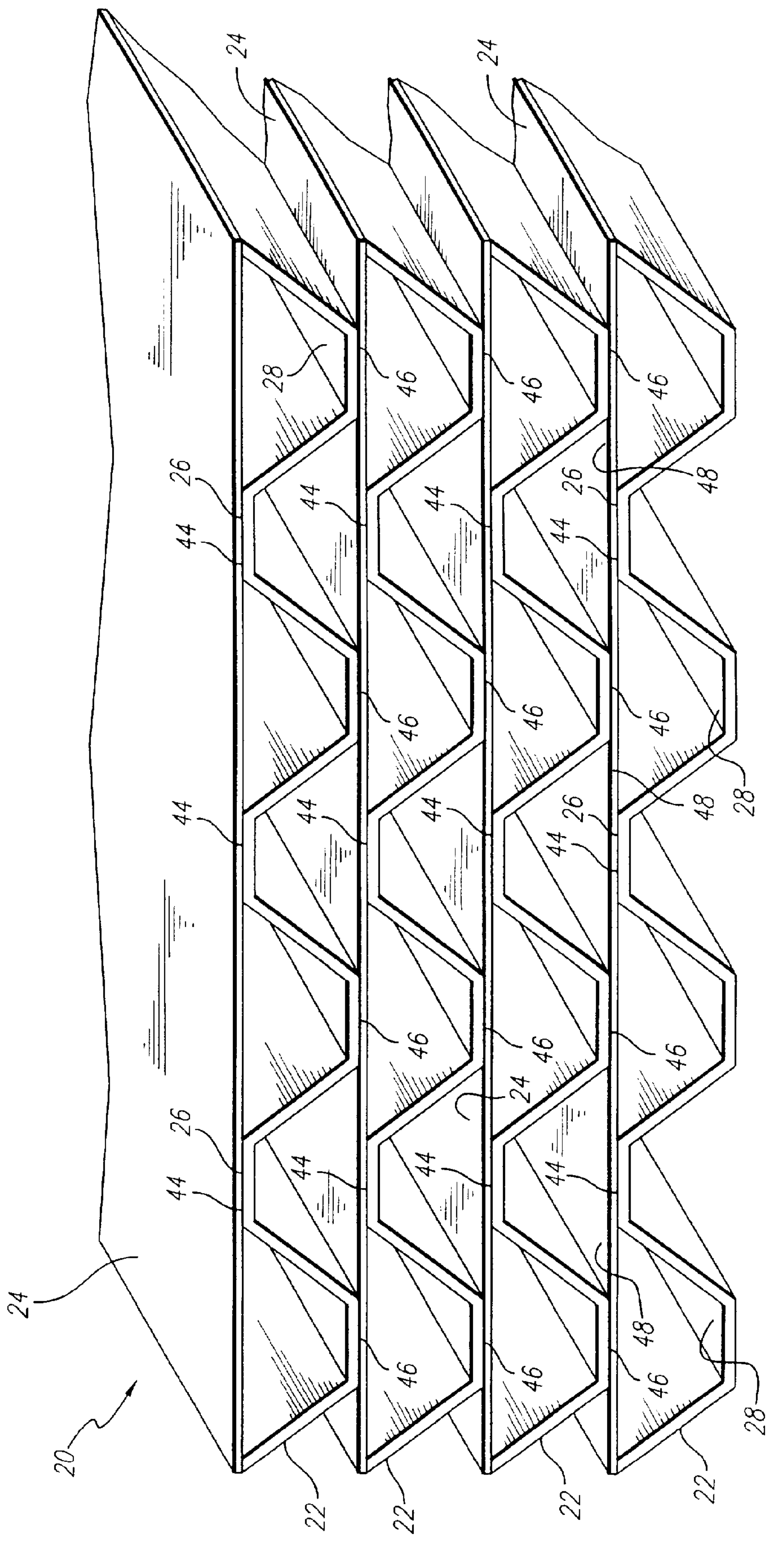
FIG. 1 is a partial perspective view of a first preferred exemplary formable heavy density honeycomb in accordance with the present invention.

A first preferred exemplary heat formable heavy density honeycomb in accordance with the present invention is shown generally at 20 in FIG. 1. The honeycomb 20 is made up of a plurality of primary corrugated sheets 22 and bisector sheets 24. The structure 20 shows only a portion of a honeycomb structure which includes four primary corrugated sheets and four bisector sheets. As is well known in the art, honeycomb structures may include hundreds of primary corrugated sheets and bisector sheets. For exemplary purposes, only a small portion of an actual honeycomb structure is shown.

A more detailed view of a portion of a single primary corrugated sheet 22 and bisector sheet 24 is shown in FIG. 3. Two sheets are shown prior to bonding together. Referring to FIGS. 1 and 3, each of the primary corrugated sheets includes a plurality of alternating upper nodes 26 and lower nodes 28. Each upper node 26 includes a top surface 30 and bottom surface 32 (see FIG. 3). Likewise, each lower node 28 includes a top surface 34 and a bottom surface 36. The bisector sheets 24 each have a top surface 38 and a bottom surface 40.

Figure 5:
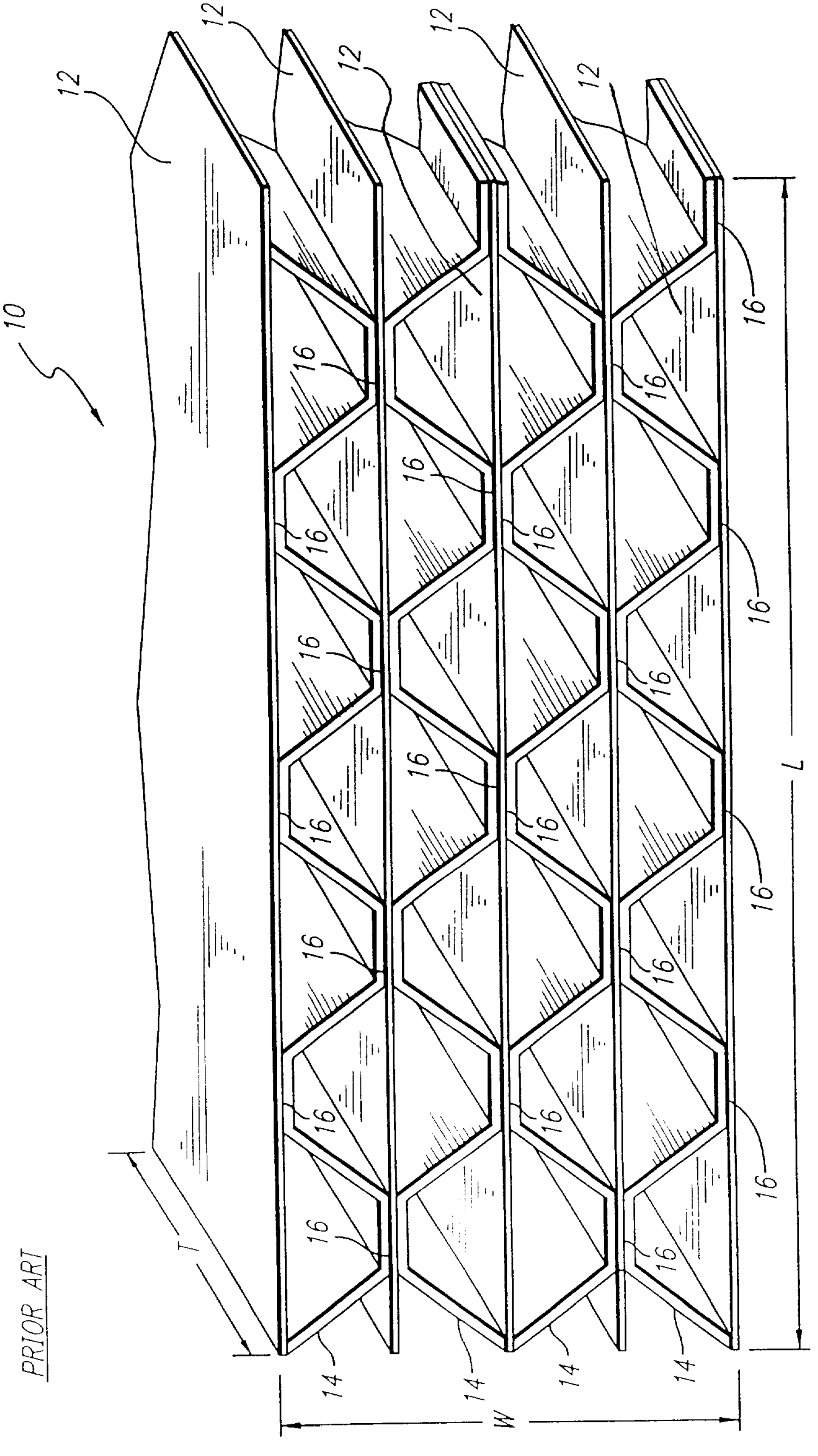
FIG. 5 PRIOR ART
FIG. 5 is a partial perspective view of a prior art high density honeycomb.

The primary corrugated sheets 22 and bisector sheets 24 are stacked to form the honeycomb structure 20 which includes alternating layers of the two sheets. As represented in FIG. 3, by arrow 42, the nodes 26 and 28 of the corrugated sheets are bonded to the bisector sheets so that the top surfaces 30 of upper node 26 are bonded to the bottom surface 40 of the bisector sheets 24. This produces a series of upper node bond locations on the bisector sheets as shown at 44 in FIG. 1. The bottom surfaces 36 of lower nodes 34 are bonded to the top surface 38 of the bisector sheets 24 at lower node bond locations 46 on the bisector sheets. In accordance with the present invention, the upper node bond locations 44 and lower node bond locations 46 on each individual bisector sheet are displaced from each other as shown in FIG. 1. This is a substantial departure from prior high density honeycomb structures as shown in FIG. 5 where the upper node bond locations and lower node bond locations coincide for each bisector sheet. This displacement of the upper node and lower node bond locations on each bisector sheet allows the sheet to flex in a way which is not possible when the upper node bond locations and lower node bond locations coincide. This displacement of the upper node and lower node bond locations on the bisector sheets allows the planar honeycomb structures 20 shown in FIG. 1 to be formed into a wide variety of non-planar shapes.

The exemplary embodiment shown in FIG. 1 depicts the upper node bond locations 44 and lower node bond locations 46 being displaced apart from each other on each bisector sheet 24 in a uniform manner. The present invention also contemplates displacing the upper node and lower node bond locations 44 and 46 in a non-uniform manner when specialized formability properties are desired. For example, the upper and lower node bond locations are shown in FIG. 1 as being centered over each other with the corrugated sheets being uniformly displaced. It is possible in accordance with the present invention to shift one or more of the corrugated sheets so that the upper and lower node bond locations do not follow the uniform pattern shown in FIG. 1. The only requirement is that the upper node bond locations 44 and lower node bond locations 46 for a given bisector sheet do not coincide. Instead, they are displaced from each other a sufficient amount so that the bisector sheet may flex in the areas located between the node bonds. A few of these bisector sheet flex regions are shown at 48 in FIG. 1. The bisector flex regions 48 shown in FIG. 1 are all the same size. As mentioned above, the corrugated sheets 22 may be shifted during the bonding process to achieve a wide variety of different flex region sizes within a given honeycomb structure. However, it is preferred that the flex regions 48 be uniform in size throughout the honeycomb structure so that the various node bond locations line up and remain co-planar within the honeycomb structure.

Figure 2:
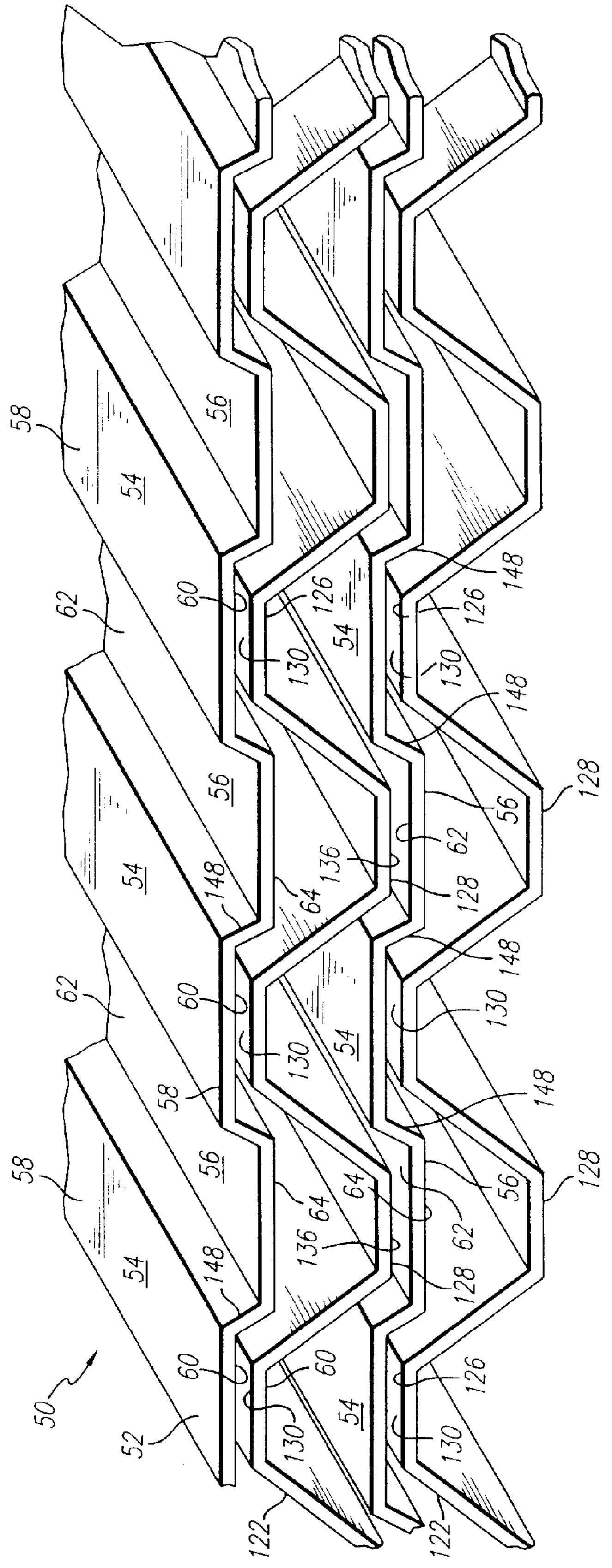
FIG. 2 is a partial perspective view of a second preferred exemplary formable heavy density honeycomb in accordance with the present invention.

A second preferred exemplary heavy density honeycomb structure in accordance with the present invention is shown generally at 50 in FIG. 2. As was the case with the first embodiment, only a portion of an overall honeycomb structure is shown for exemplary purposes. The honeycomb structure 50 is basically the same as the first exemplary honeycomb structure 20, except that the bisector sheets 52 are not substantially flat as are bisector sheets 24 in the first embodiment. Instead, bisector sheets 52 are corrugated. As shown in FIGS. 2 and 4, each bisector sheet 52 includes alternating upper bisector nodes 54 and lower bisector nodes 56. Each upper bisector node 54 includes a top surface 58 and bottom surface 60. The lower bisector nodes 56 include top surfaces 62 and bottom surfaces 64. As shown in FIGS. 2 and 4, the bottom surface 60 of each upper bisector node 54 is bonded to the top surface 130 of upper node 126 of the primary corrugated sheet 122. The top surface 62 of each lower bisector node 56 is bonded to the bottom surface 136 of each lower node 128 of the primary corrugated sheet 122. This particular honeycomb 50 differs from honeycomb 20 in that the flexible regions of the bisector sheets 148 shown in FIG. 2 are at an angle relative to the honeycomb nodes. This particular configuration is well suited for situations where high degrees of formability are required.

Figure 6:
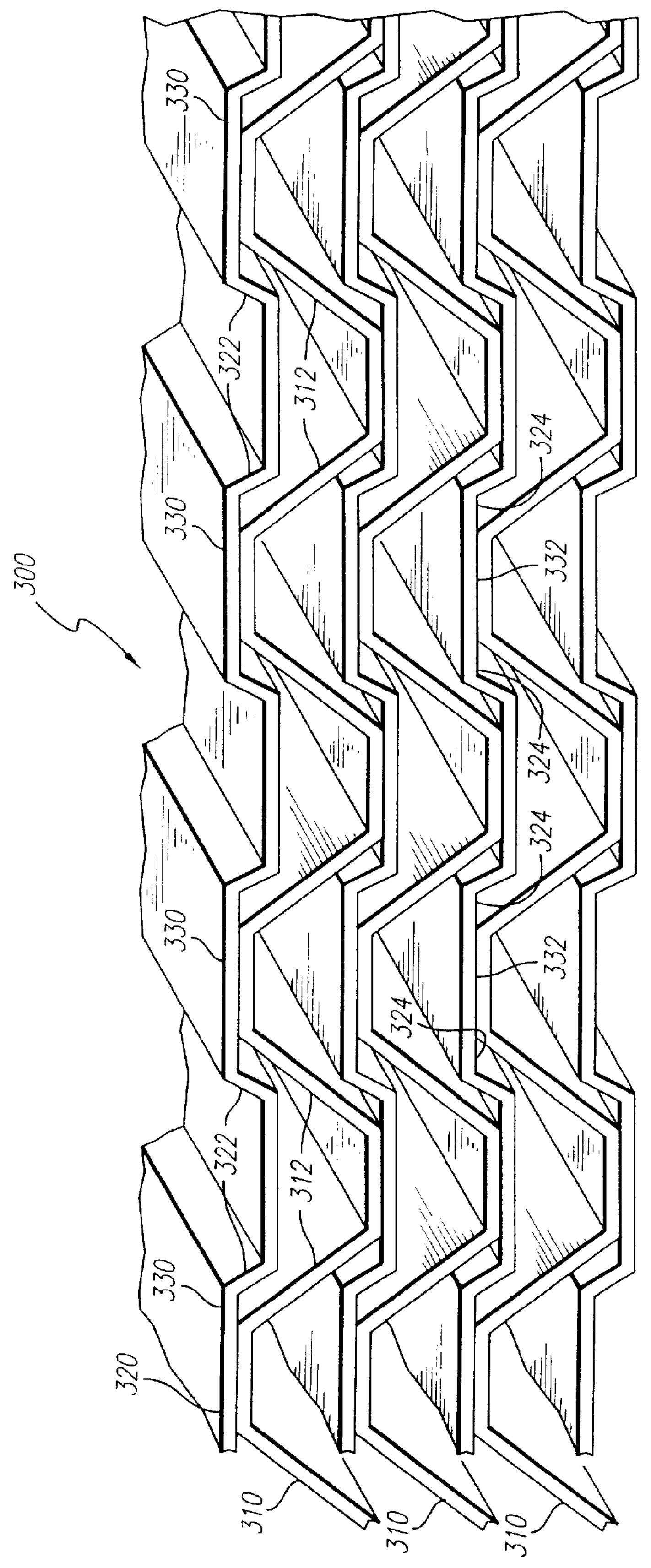
FIG. 6 is a partial perspective view of a third preferred exemplary embodiment of the invention.

A third exemplary honeycomb structure in accordance with the present invention is shown generally at 300 in FIG. 6. The honeycomb structure 300 is similar to the honeycomb structure 50 in that it includes alternating primary corrugated sheets 310 and corrugated bisector sheets 320. The corrugated sheets 320 have angled corrugated portions 322 which are oriented at a steeper angle than the corrugations 312 of the corresponding primary corrugated sheet 310. Specifically, the corrugated angle portions 322 are at an angle of about 70° relative to the flat portion of the bisector sheet, whereas the corrugated portions of the primary sheet are at an angle of about 77° relative to the flat portion of the primary corrugated sheet. This is to be contrasted with the honeycomb structure in FIG. 2 wherein the corrugated portion 148 of the bisector sheet is at an angle relative to the flat portion of the bisector sheet which is greater than the angle of the corrugated portion of the primary sheet.

Another difference between the honeycomb structure 300 and honeycomb structure 50 is that the bisector nodes 330 are wider than the underlying upper surface of the primary sheets 310. As a result, the primary sheets 310 are bonded to the corrugated sheet nodes 30 only at the center portion of the nodes 330 as shown at 332. This leaves further flex portions 324 on either side of the node bond. In the honeycomb structure 50, the size of the bisector sheet nodes and primary corrugated sheets are selected so that they bond together across the entire bisector sheet node. Honeycomb structures of the type shown in FIG. 6 are preferred where additional flexibility and formability is desired. The size of the bisector sheet node can be increased or alternatively the size of the corrugated sheet bonding surface decreased in order to provide a wide range of adhesive node fingerprints. The fingerprints can range from complete bonding of the entire surface area of the bisector node to the primary sheets as shown in FIG. 2. Alternatively, the fingerprint can be a partial bonding of the bisector sheet to the primary sheet as shown in FIG. 6. The principal limitation on the node bond fingerprint is that a sufficient area of the bisector sheet and primary corrugated sheet must be bonded to achieve desired honeycomb strength.

The honeycomb structures 20 and 50 shown in FIGS. 1 and 2 are made in accordance with conventional processes for making high density honeycombs of the type shown in FIG. 5. In general, an adhesive is applied to the primary corrugated sheet along the top of the upper nodes and along the bottom of the lower nodes. Bisector sheets are then placed on the top and bottom of the corrugated sheet. Adhesive is then applied to another corrugated sheet in the same manner as the first sheet and this additional corrugated sheet is then placed on top of the previously placed top bisector sheet. This process is repeated until the honeycomb stack has reached the desired height.

The materials which can be used for the primary corrugated sheets, bisector sheets (both flat and corrugated) and adhesives may be any of those which are used to form high density honeycomb structures of the type shown in FIG. 5. Although the present invention may be used in connection with metallic honeycomb structures, its preferred use is in connection with non-metallic structures which are intended for heat forming into non-planar structures. Exemplary materials which may be used as the primary corrugated sheets include plastics and composite materials which include a wide variety of fiber configurations which are combined with a resin matrix. Exemplary fibers which may be used in the composite materials include glass, carbon, boron and ceramic fibers. Preferred resins for use as the resin matrix include those which are amenable to heat forming. Such resins include high temperature polyimides, phenolics and epoxies. Any of the glass reinforced honeycomb materials, aramid-fiber reinforced honeycomb materials and resin-dipped paper honeycomb materials may be used in accordance with the present invention.

A wide variety of adhesive materials may also be used. Exemplary adhesives include nitrile phenolic adhesives, epoxy adhesives, polyamid adhesives, urethane adhesives, polyimide adhesives and other high temperature adhesives.

The honeycomb structures shown in FIG. 1 and FIG. 2 are planar in shape. In accordance with the present invention, these structures may be formed into a variety of non-planar structures. The preferred forming procedure involves application of heat to the honeycomb structure to raise the temperature of the honeycomb to a sufficient level to allow thermal forming. For such thermal forming processes, the particular resin used in the fiber reinforced composite is selected to be sufficiently thermoplastic to allow thermal forming. For example, high temperature polyimides, phenolics and epoxies are suitable resins which may be thermal formed in accordance with the present invention when used in combination with various substrates, such as glass or carbon fibers. In general, the high density honeycomb is heated to temperatures on the order of between about 200° C. to 350° C. and then formed to the desired final structural shape by using molds or other conventional thermal forming equipment. This procedure is well suited for forming honeycomb structures which require both strength and small radiuses in complex shapes.

Exemplary honeycomb material combinations are set forth in the following Table.

| Honeycomb Type | Fiber | Resin Matrix | Node Adhesive |
|---|---|---|---|
| High Temp (>350° C.) High Modulus | Carbon | Polyimide | Polyimide |
| High Temp (>350° C.) Low Modulus | Glass | Polyimide | Polyimide |
| Low Temp (<350° C.) High Modulus | Carbon | Polyimide or Phenolic | Polyimide or Phenolic |
| Low Temp (<350° C.) Low Modulus | Glass | Phenolic | Polyimide or Phenolic |

Having thus described exemplary embodiments of the present invention, it should be noted by those skilled in the art that the within disclosures are exemplary only and that various other alternatives, adaptations, and modifications may be made within the scope of the present invention. Accordingly, the present invention is not limited to the specific embodiments as illustrated herein, but is only limited by the following claims.

What is claimed is:

1. A heavy density honeycomb having increased formability, said honeycomb comprising:

a plurality of primary corrugated sheets wherein each primary corrugated sheet comprises a plurality of alternating upper nodes and lower nodes and wherein each upper node comprises a top surface and a bottom surface and each lower node comprises a top surface and a bottom surface; and a plurality of bisector sheets wherein each bisector sheet comprises a top surface and a bottom surface, said corrugated sheets and said bisector sheets being stacked to form said honeycomb structure comprising alternating layers of primary corrugated sheets and bisector sheets wherein the top surfaces of said upper nodes are bonded to said bottom surface of said bisector sheets at upper node bond locations on said bisector sheets and the bottom surfaces of said lower nodes are bonded to said top surface of said bisector sheets at lower node bond locations on said bisector sheets and wherein the upper node bond locations and lower node bond locations on each bisector sheet are displaced from each other.

2. A heavy density honeycomb structure according to claim 1 wherein at least one of said bisector sheets is substantially flat.

3. A heavy density honeycomb structure according to claim 1 wherein at least one of said bisector sheets is a corrugated bisector sheet which comprises a plurality of alternating upper bisector nodes and lower bisector nodes, wherein each upper bisector node comprises a top surface and a bottom surface and each lower bisector node comprises a top surface and a bottom surface and wherein the bottom surface of each upper bisector node is bonded to the top surface of a primary corrugated sheet upper node and the top surface of each lower bisector node is bonded to the bottom surface of a primary corrugated sheet lower node.

4. A heavy density honeycomb structure according to claim 2 wherein substantially all of said bisector sheets in said honeycomb structure are substantially flat.

5. A heavy density honeycomb structure according to claim 3 wherein substantially all of said bisector sheets are corrugated bisector sheets.

6. A heavy density honeycomb structure according to claim 1 wherein said honeycomb structure is planar.

7. A heavy density honeycomb structure according to claim 1 wherein said honeycomb structure is non-planar.

8. A heavy density honeycomb structure according to claim 1 wherein said primary corrugated sheets comprise a material selected from the group consisting of metals, plastics, composite materials and resin-dipped papers.

9. A heavy density honeycomb structure according to claim 1 wherein said bisector sheets comprise a material selected from the group consisting of metals, plastics, composite materials and resin-dipped papers.

10. A heavy density honeycomb structure according to claim 1 wherein said primary corrugated sheets are bonded to said bisector sheets with an adhesive selected from the group consisting of nitrile phenolic adhesives, epoxy adhesives, urethane adhesives and polyimide adhesives.

11. A method for making a heavy density honeycomb having increased formability, said method comprising the steps of:

providing a plurality of primary corrugated sheets wherein each primary corrugated sheet comprises a plurality of alternating upper nodes and lower nodes and wherein each upper node comprises a top surface and a bottom surface and each lower node comprises a top surface and a bottom surface; and providing a plurality of bisector sheets wherein each bisector sheet comprises a top surface and a bottom surface; and bonding said corrugated sheets and said bisector sheets together to form said honeycomb structure comprising alternating layers of primary corrugated sheets and bisector sheets wherein the top surfaces of said upper nodes are bonded to said bottom surface of said bisector sheets at upper node bond locations on said bisector sheets and the bottom surfaces of said lower nodes are bonded to said top surface of said bisector sheets at lower node bond locations on said bisector sheets and wherein the upper node bond locations and lower node bond locations on each bisector sheet are displaced from each other.

12. A method for making a heavy density honeycomb structure according to claim 11 wherein at least one of said bisector sheets is substantially flat.

13. A method for making a heavy density honeycomb structure according to claim 11 wherein at least one of said bisector sheets is a corrugated bisector sheet which comprises a plurality of alternating upper bisector nodes and lower bisector nodes, wherein each upper bisector node comprises a top surface and a bottom surface and each lower bisector node comprises a top surface and a bottom surface and wherein the bottom surface of each upper bisector node is bonded to the top surface of a primary corrugated sheet upper node and the top surface of each lower bisector node is bonded to the bottom surface of a primary corrugated sheet lower node.

14. A method for making a heavy density honeycomb structure according to claim 12 wherein substantially all of said bisector sheets in said honeycomb structure are substantially flat.

15. A method for making a heavy density honeycomb structure according to claim 13 wherein substantially all of said bisector sheets are corrugated bisector sheets.

16. A method for making a heavy density honeycomb structure according to claim 11 wherein said honeycomb structure is planar.

17. A method for making a heavy density honeycomb structure according to claim 16 which includes the additional step of forming said planar honeycomb structure into a non-planar honeycomb structure.

18. A method for making a heavy density honeycomb structure according to claim 17 wherein said step of forming said planar honeycomb structure into a non-planar honeycomb structure comprises the application of heat to said planar honeycomb structure.

19. A method for making a heavy density honeycomb structure according to claim 11 wherein said primary corrugated sheets comprise a material selected from the group consisting of metals, plastics, composite materials and resin-dipped papers.

20. A method for making a heavy density honeycomb structure according to claim 11 wherein said bisector sheets comprise a material selected from the group consisting of metals, plastics, composite materials and resin-dipped papers.

21. A method for making a heavy density honeycomb structure according to claim 11 wherein said primary corrugated sheets are bonded to said bisector sheets with an adhesive selected from the group consisting of nitrile phenolic adhesives, epoxy adhesives, urethane adhesives and polyimide adhesives.

* * * * *